US006309614B1

(12) United States Patent
Horwitz et al.

(10) Patent No.: US 6,309,614 B1
(45) Date of Patent: Oct. 30, 2001

(54) METHOD FOR ISOLATING AND PURIFYING $^{90}$Y FROM $^{90}$STRONTIUM IN MULTI-CURIE QUANTITIES

(75) Inventors: E. Philip Horwitz, Naperville; John J. Hines, Newark, both of IL (US)

(73) Assignee: PG Research Foundation, Inc., Darien, IL (US)

( * ) Notice: Subject to any disclaimer, the term of this patent is extended or adjusted under 35 U.S.C. 154(b) by 0 days.

(21) Appl. No.: 09/549,871

(22) Filed: Apr. 14, 2000

(51) Int. Cl.[7] ........................................ C01F 17/00

(52) U.S. Cl. ........................................ 423/2

(58) Field of Search ........................ 423/2, 21.5, 162; 210/635

(56) References Cited

U.S. PATENT DOCUMENTS

| | | | | |
|---|---|---|---|---|
| 4,835,107 | | 5/1989 | Horwitz et al. . | |
| 5,100,585 | | 3/1992 | Horwitz et al. . | |
| 5,110,474 | | 5/1992 | Horwitz et al. . | |
| 5,154,897 | * | 10/1992 | Ehrhardt et al. | 423/6 |
| 5,225,173 | * | 7/1993 | Wai | 423/2 |
| 5,344,623 | | 9/1994 | Horwitz et al. . | |
| 5,368,736 | | 11/1994 | Horwitz et al. . | |
| 5,494,647 | * | 2/1996 | Huntley | 423/2 |
| 5,508,011 | * | 4/1996 | Lo et al. | 423/2 |
| 5,512,256 | * | 4/1996 | Bray et al. | 423/2 |
| 5,902,566 | * | 5/1999 | Chinol et al. | 424/1.49 |

FOREIGN PATENT DOCUMENTS

| | | | |
|---|---|---|---|
| 60-097300 | * | 5/1985 | (JP) . |
| 753037 | * | 9/1983 | (SU) . |
| 93/23854 | * | 11/1993 | (WO) . |

* cited by examiner

*Primary Examiner*—Steven Bos
(74) *Attorney, Agent, or Firm*—Mayer, Brown & Platt

(57) ABSTRACT

The invention relates to a process for separating and purifying multi-curie quantities $^{90}$Y of sufficient chemical and radiochemical purity suitable for use in medical applications without a series of $^{90}$Sr selective extraction chromatographic columns while minimizing loss of radioactive $^{90}$Sr parent and waste stream. The process includes dissolving a nitrate salt of an original $^{90}$Sr stock solution in $H_2O$ creating a strontium nitrate solution; acidifying the strontium nitrate solution containing $^{90}$Y with concentrated nitric acid; evaporating the strontium nitrate solution; filtering or centrifuging strontium nitrate solution to separate crystalline $^{90}$Sr nitrate salt from the solution; evaporating the remaining $^{90}$Y enriched supernate to dryness; dissolving the remaining $^{90}$Y enriched supernate in a strong acid; passing the solution through an yttrium selective extraction chromatographic column; rinsing the yttrium selective extraction chromatographic column with strong acid; and eluting yttrium from yttrium selective extraction column with strong acid.

20 Claims, 2 Drawing Sheets

METHOD FOR ISOLATING AND PURIFYING $^{90}$Y FROM $^{90}$STRONTIUM IN MULTI-CURIE QUANTITIES

FIELD OF THE INVENTION

This invention relates to a new process of separating and purifying multi-curie quantities of yttrium-90 from strontium-90 and other trace elements and impurities while minimizing loss of strontium and amount of waste generated.

BACKGROUND OF THE INVENTION

Although the possibility of treating rheumatoid arthritis, other inflamed joints, and cancer with yttrium-90 ($^{90}{}_{39}$Y) is well known, a cost effective way to separate $^{90}$Y of sufficient purify that minimizes loss of radioactive Sr and does not generate a large waste stream is still needed. $^{90}$Y results from the decay of strontium-90 and $^{90}$Y decays to stable $^{90}$Zr according to the following scheme:

$$^{90}_{38}Sr \xrightarrow[29\ \text{Years}]{} {}^{90}_{39}Y + B^- \ (0.54\ \text{MeV});$$

$$^{90}_{39}Y \xrightarrow[64.0\ \text{hours}]{} {}^{90}_{40}Zr + B^- \ (2.28\ \text{MeV})$$

$^{90}$Y has a relatively short half-life (64.0 h) and maximum beta energy (2.28 MeV) which makes it suitable for a variety of therapeutic uses such as radiolabeling antibodies for tumor therapy or treating liver malignancies.

Although it is known that $^{90}$Y is suitable for immuno radiotherapy, scientists and doctors have encountered numerous difficulties using $^{90}$Y for medical treatments because of the absence of a cost effective way to separate $^{90}$Y of sufficient purity while minimizing loss of radioactive Sr without generating a large waste stream. The following non-exclusive non-exhaustive list of difficulties in separating and purifying $^{90}$Y have limited the application of $^{90}$Y for medical treatment. Although the half-life and decay scheme of $^{90}$Y is appropriate for various radio therapy applications, $^{90}$Y must be capable of being produced in sufficient multi-curie quantities. Furthermore, before $^{90}$Y can be safely used in clinical applications, $^{90}$Y must be essentially free of $^{90}$Sr and any other trace elements. $^{90}$Y must be free of $^{90}$Sr by at least a factor of $10^7$ because $^{90}$Sr can suppress bone marrow production. $^{90}$Y must also be free from any trace elements, such as Ca, Cu, Fe, Zn, and Zr, and other impurities because trace elements could interfere with the radio labeling process by competing with $^{90}$Y for binding sites. All of these difficulties must be overcome in a cost effective manner while minimizing loss of valuable radioactive Sr without generating large amounts of waste.

In the past, $^{90}$Y has been separated from $^{90}$Sr by solvent extraction, ion-exchange, precipitation, and various forms of chromatography, all of which fail to separate $^{90}$Y of sufficient quantity and purity in a cost effective manner that minimizes loss of radioactive Sr and does not generate a large waste stream. Numerous procedures use a cation exchange resin (e.g. Dowex 50) to retain $^{90}$Sr, while the $^{90}$Y is eluted with an aqueous solution such as lactate, acetate, citrate, oxalate, or EDTA. Several of these procedures have been proposed as the basis for a $^{90}$Y generator system.

U.S. Pat. No. 5,100,585, and U.S. Pat. No. 5,344,623 describe processes for recovering strontium and technetium from acidic feed solutions containing other fission products.

Another process for separating $^{90}$Y from $^{90}$Sr involves extracting $^{90}$Y from a dilute acid solution of $^{90}$Sr/$^{90}$Y using bis 2-ethylhexyl phosphoric acid in dodecane. This procedure has the disadvantages of having a limited generator lifespan and accumulating radiolytic by-products in the $^{90}$Sr stock. This process also has the disadvantage of requiring repeated stripping of the initial extractant solution to reduce trace impurities and repeated washing of stock solution to destroy dissolved organic phosphates.

Kanapilly and Newton (1971) have described a process for separating multi-curie quantities of $^{90}$Y from $^{90}$Sr by precipitating $^{90}$Y as a phosphate. This process, however, requires adding nonradioactive yttrium as a carrier, yielding $^{90}$Y which are obviously not carrier free and hence unsuitable for site specific binding. This and other prior art teach the addition of only nonradioactive yttrium. This and other prior art do not teach the addition of nonradioactive strontium. In fact, the prior art teaches away from adding nonradioactive strontium.

U.S. Pat. No. 5,368,736 describes a process for isolating $^{90}$Y from a stock solution of $^{90}$Sr. The $^{90}$Sr solution is stored for a sufficient period of time to allow $^{90}$Y ingrowth to occur. This process teaches the use of a series of Sr selective columns at the initial stages of the process. A major disadvantage is that $^{90}$Sr must be stripped off from each of the strontium-selective extraction chromatographic column because $^{90}$Sr is very valuable and it must be recycled to allow for new $^{90}$Y growth.

Unfortunately, all the various methods mentioned above suffer from one or more of the following disadvantages. The first disadvantage of these methods is that the concentration of trace elements is too high and the trace elements thereby compete with $^{90}$Y for binding sites, resulting in a decrease in $^{90}$Y labeling. Thus, it is necessary to either remove trace elements and other impurities prior to antibody labeling or carry out postlabeling purification. The second disadvantage is that ion-exchange resins gradually lose capacity due to radiation damage. As a result, ion-exchange is considered suitable only for purifying and separating subcurie quantities of $^{90}$Y, which is less than the multi quantities of $^{90}$Y needed for clinical applications. The third disadvantage is that separating $^{90}$Y in acceptable purity and quantity while minimizing $^{90}$Sr breakthrough often requires using a series of long ion-exchange columns and impractically large volumes of eluent. A need still exists for a cost effective process of separating $^{90}$Y of sufficient quality and quantity without a series of $^{90}$Sr selective extraction chromatographic columns while minimizing loss of $^{90}$Sr and without generating large amounts of waste and using large volumes of eluent.

SUMMARY OF THE INVENTION

This invention relates to a new process for separating and purifying multi-curie quantities $^{90}$Y of sufficient chemical and radiochemical purity suitable for use in medical applications without a series of $^{90}$Sr selective extraction chromatographic columns while minimizing loss of radioactive $^{90}$Sr parent and waste stream.

It is an object of the invention to separate $^{90}$Y from Sr by a highly selective and efficient Sr precipitation procedure and using Y selective resins and no Sr selective resins. Another object of this invention is to provide a process for separating $^{90}$Y from Sr where $^{90}$Sr activity in $^{90}$Y is reduced by $>10^7$. It is a further object of the invention to provide a process for separating $^{90}$Y with an overall recovery of $^{90}$Y>95%. Furthermore, another object of the invention is to provide a process for separating $^{90}$Y with an overall recovery of $^{90}$Sr>99.9% and improved purity with each processing run. Furthermore, another object of the invention is to provide a rapid process for separating $^{90}$Y such that waste generation and radiation damage is minimum.

BRIEF DESCRIPTION OF THE DRAWINGS

The above-mentioned and other features of the invention will become more apparent and be best understood, together with the description, by reference to the accompanying drawings, in which.

DESCRIPTION OF THE PREFERRED EMBODIMENTS

Figure 1:
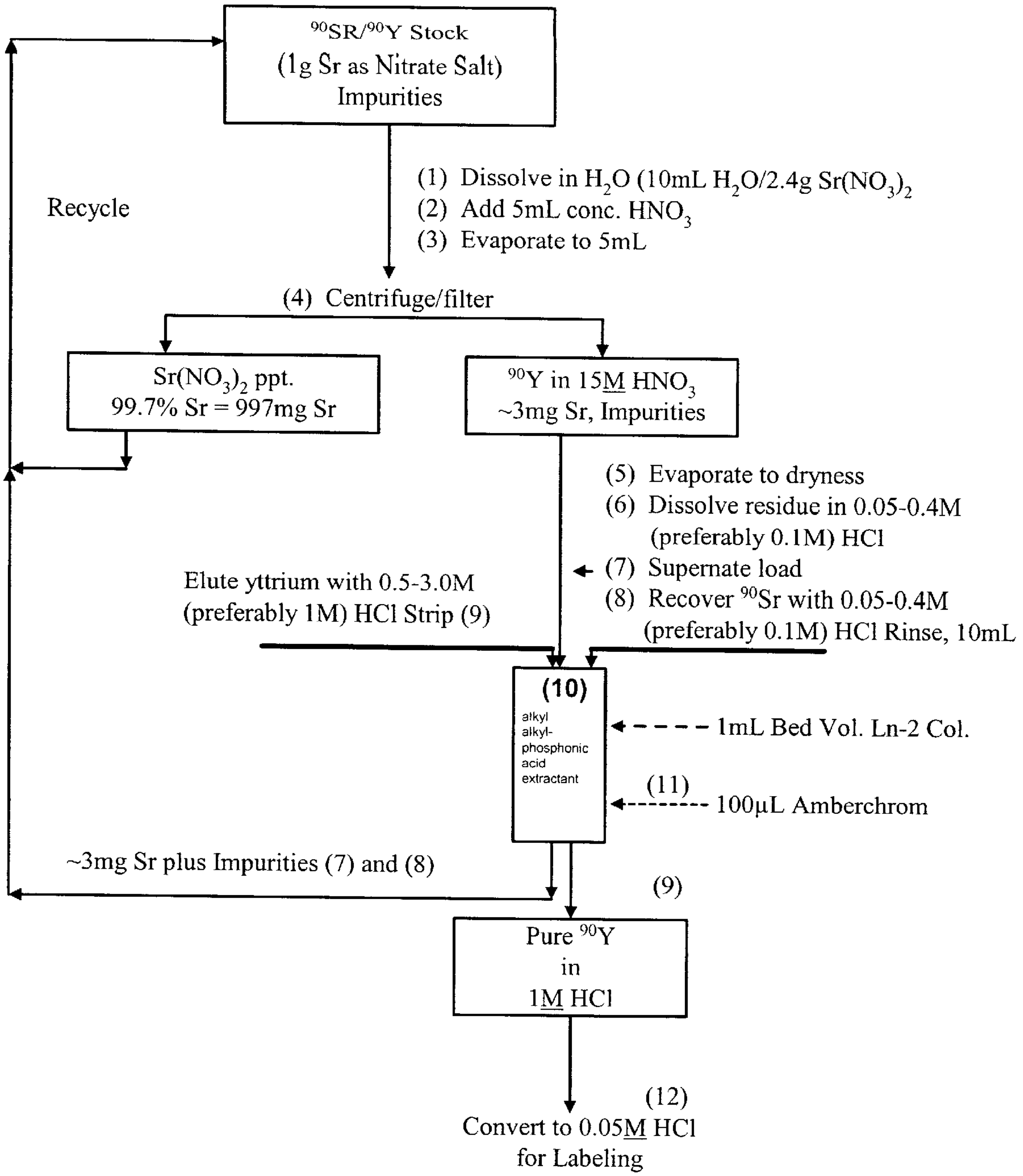
FIG. 1 shows a single column arrangement for isolating $^{90}Y$ from $^{90}Sr$ in accordance with the following steps: dissolving strontium nitrate in $H_2O$; acidifying the strontium nitrate solution with concentrated nitric acid; evaporating said solution; separating $^{90}Sr$ from solution by filtering or centrifuging; evaporating the remaining $^{90}Y$ enriched supemate; dissolving the remaining $^{90}Y$ enriched supernate in 0.1 to 0.2M HCL; passing the supernate through an yttrium selective extraction chromatographic column containing alkyl alkylphosphonic acid; rinsing the yttriun selective extraction chromatographic column with HCL; and removing yttrium from yttrium selective extraction column with 1 to 2M HCL.

FIG. 1 depicts the new simplified process, with only one chromatographic column, for separating $^{90}Y$ of sufficient purify and multi-curie quantity while minimizing loss of radioactive $^{90}Sr$. Initially, $^{90}Y$ is separated from approximately 99.7% of the $^{90}Sr$ by precipitating the strontium as a nitrate salt from a nitric acid eutectic (16M). Essentially all of the yttrium remains in solution together with any ferric iron and zirconium while the strontium is selectively precipitated out. To reduce the loss of valuable $^{90}Sr$ to the yttrium supernate and to increase the ease of handling radioactive multi curie quantities of $^{90}Y$, stable strontium is added to the $^{90}Sr$. At least 80 to 90% of the mass of strontium that is present in the initial $^{90}Sr/^{90}Y$ stock solution should be stable Sr, i.e., $^{86,87,88}Sr$ isotopes. Requiring that 80–90% of the strontium mass be stable strontium isotopes, as opposed to radioactive $^{90}Sr$, reduces the specific activity of the mixture. Minimizing amounts of $^{90}Sr$ is crucial if one desires $^{90}Y$ suitable for radio therapeutic applications. When $^{90}Sr$ is present in great quantity, more steps and materials are needed to separate and purify $^{90}Y$. For example, three Sr selective chromatography columns are used in the process disclosed in U.S. Pat. No. 5,368,736. By contrast, this new process, which minimizes amounts of radioactive $^{90}Sr$, does not require any $^{90}Sr$ selective chromatography. This new process thus saves money, space, time, and waste while decreasing $^{90}Sr$ contamination.

As shown in FIG. 1, precipitating strontium as a nitrate salt is achieved by first dissolving the strontium nitrate salt in $H_2O$, 1 FIG. 1. Approximately 10 mL of $H_2O$ is used for one gram of Sr as the nitrate salt. If the initial weight of $^{90}Sr$ is 20% by mass, one has 28 curies (200 mg) of radioactivity which is a very substantial amount. After dissolving the strontium nitrate in $H_2O$, 5 mL of concentrated nitric acid is added, 2 (FIG. 1), the volume is reduced to 5 mL by evaporating, 3 (FIG. 1). Centrifuging or filtering, 4 (FIG. 1), the mixture precipitates approximately 99.7% of the Sr as strontium nitrate. Having started out with 1 g of Sr (=1000 mg), this means that 99.7% or better of 1 g Sr precipitates out. (99.7% of 1 g=997 mg). Hence 997 mg of Sr precipitates out and 3 mg of the original starting Sr remains in the supernate. Of the 3 mg Sr remaining in the supernate, only 0.3 to 0.6 mg are radioactive $^{90}Sr$ if the initial mixture contained 10 to 20% $^{90}Sr$, respectively (10% of 3 mg=0.3 mg and 20% of 3 mg=0.6 mg).

The concentrated nitric acid supernate is evaporated to dryness, 5 (FIG. 1), and the residue dissolved in 2 to 4 mL of 0.05–0.4 M HCL, preferably 0.1M HCL, 6. The acid does not have to be HCL. The acid may be a strong acid consisting of nitric acid ($HNO_3$), perchloric acid ($HCLO_4$), and sulfuric acid ($H_2SO_4$). The resultant supernate load, 7, (FIG. 1) is passed through only one extraction chromatographic column, 10 (FIG. 1), (usually only one mL in bed volume) containing an alkyl alkylphosphonic acid extractant sorbed on an inert polymeric support. The extraction chromatographic column containing the alkyl alkylphosphonic acid extractant is highly selective for $^{90}Y$. The alkyl alkylphosphonic acid column selectively retains yttrium while all alkali and alkaline earth metal ions (including valuable $^{90}Sr$) and divalent transition and post transition metal ions pass through and are recycled back to the $^{90}Sr$ stock solution, 7 and 8 (FIG. 1). The yttrium-selective extractant may be obtained from commercially available 2-ethylhexyl 2-ethylhexylphosphonic acid. However, extraction chromatographic columns prepared from the material must undergo extensive purification using selected complexing agents and acids. The length of the carbon chain ($C_n$) in alkyl alkylphosphonic acid can vary. The alkyl alkylphosphophonic acid is preferably selected from any alkyls consisting of $C_5$, $C_6$, $C_7$, $C_8$, $C_9$, $C_{10}$ and $C_{11}$. This description of alkyl alkylphosphonic acid is for purposes of illustration. The description of alkyl alkylphosphonic acid is not exhaustive and does not limit the invention to the chemical structure disclosed. For example, an alkyl alkylphosphonic acid with alkyls greater than eleven carbons or less than five carbons may be used.

Extensive rinsing (e.g. 20 bed volumes) of the alkyl alkylphosphonic acid extraction chromatographic column is carried out with 0.05–0.4 M, preferably 0.1M HCL, 8 (FIG. 1), to reduce any $^{90}Sr$ present by at least $10^4$ and reduce the overall $^{90}Sr$ activity by a factor of $10^7$. The acid to remove $^{90}Sr$ does not have to be HCL. The acid may be a strong acid consisting of nitric acid ($HNO_3$), perchloric acid ($HCLO_4$), and sulfuric acid ($H_2SO_4$). Before recycling the $^{90}Sr$ that passes thru the yttrium selective column, this very small quantity of Sr can be purified by adding sufficient concentrated nitric acid to bring the final nitrate concentration to 3M $HNO_3$ and then passing the resultant solution through a Sr selective column. The addition of the $^{90}Sr$ recovered from step 7 and 8 (FIG. 1) to that recovered from step 4 (FIG. 1) gives an overall recovery of $^{90}Sr$ >99.9%. After rinsing the column, $^{90}Y$ is eluted from the yttrium selective column in 4 bed volumes using 0.5–3.0 M, preferably 1 M HCL, 9 (FIG. 1) with an overall recovery of $^{90}Y$ >95%. Ferric iron and zirconium (IV) are retained on the column. The acid does not have to be HCL. The acid to elute yttrium may be a strong acid consisting of nitric acid ($HNO_3$), perchloric acid ($HCLO_4$), and sulfuric acid ($H_2SO_4$). Any trace of organic extractant or degradation products present in the purified $^{90}Y$ are removed by passing the solution through a bed of a polymeric support such as Amberchrom XAD-7, step 11 (FIG. 1). Clinical applications require that the $^{90}Y$ product be in $\leqq$0.05M HC1 making a final evaporation of the $^{90}Y$ column strip necessary.

Figure 2:
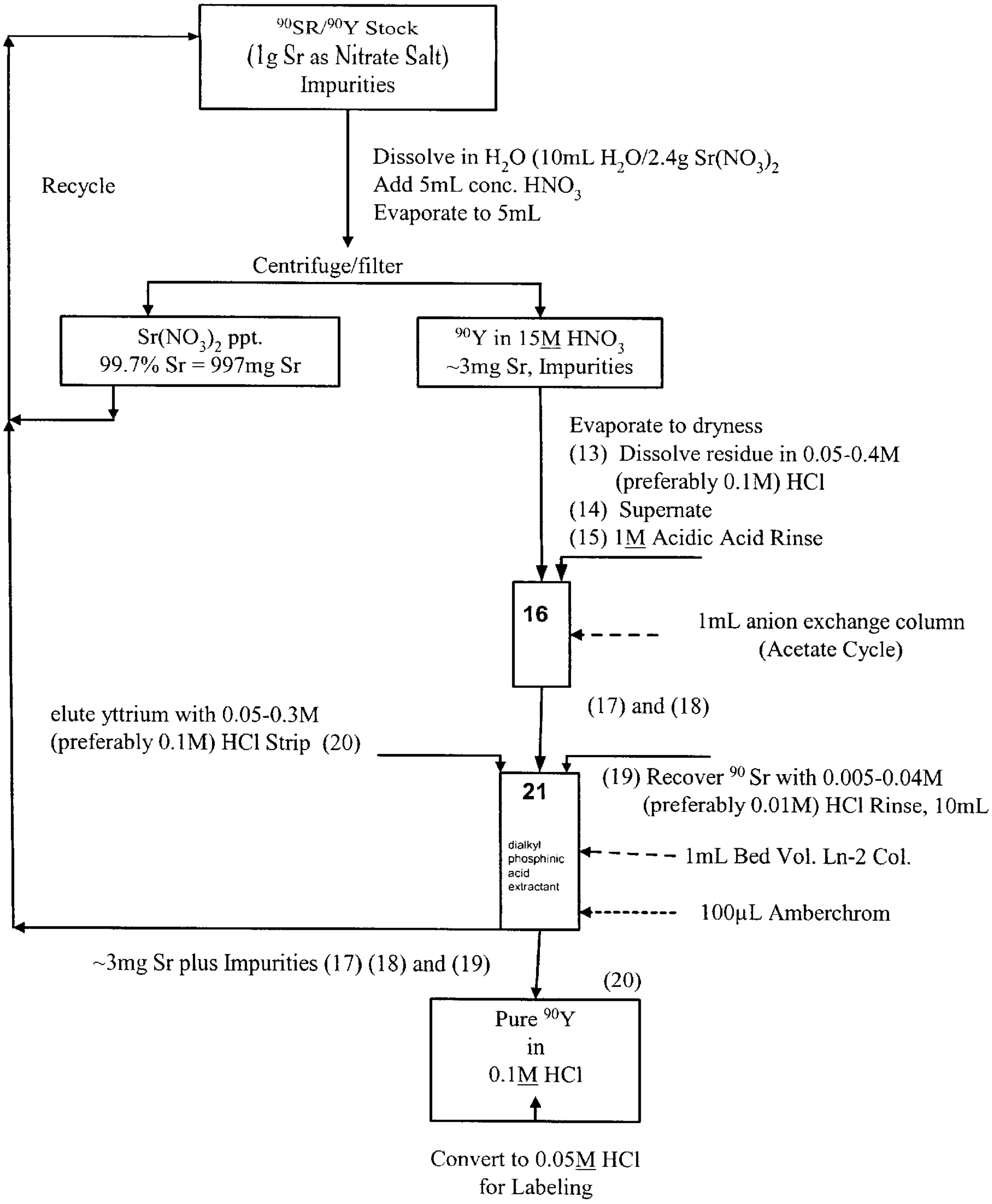
FIG. 2 shows a single column arrangement for isolating $^{90}Y$ similar to FIG. 1 except that the yttrium selective extraction chromatographic column contains dialkylphosphinic acid instead of alkyl alkylphosphonic acid.

A small variation of the above process may be carried out by replacing the extraction chromatographic column containing the alkyl alkylphosphonic acid extractant 12 (FIG. 1), with a column containing a dialkylphosphinic acid extractant 21 (FIG. 2). The length of the carbon chain ($C_n$)

in dialkylphosphinic acid may vary. Similar to alkyl alkylphosphonic acid, the dialkylphosphinic is preferably selected from any alkyls consisting of $C_5$, $C_6$, $C_7$, $C_8$, $C_9$, $C_{10}$ and $C_{11}$. The alkyls may be straight chained or branched. This description of dialkylphosphinic acid is for purposes of illustration. The description of dialkylphosphinic acid is not exhaustive and does not limit the invention to the chemical structure disclosed. For example, a dialkylphosphinic acid with alkyls greater than eleven carbons or less than five carbons may be used. Phosphinic acid extractant is more stable to hydrolysis and radiolysis but requires a much lower acidity to effectively retain yttrium. To effectively retain $^{90}Y$ (III), a solution containing only 0.01M hydrogen ion must be used.

The load for the dialkylphosphinic acid column is prepared by dissolving the residue obtained from evaporating the supernate in 0.05–0.4 HCL, preferably 0.1 M HCl, 13 (FIG. 2), and passing this solution through a small (1 to 2 mL) bed volume column containing a conventional strong base anion exchange resin on the acetate cycle. The acid does not have to be HCL. The acid may be a strong acid consisting of nitric acid ($HNO_3$), perchloric acid ($HCLO_4$), and sulfuric acid ($H_2SO_4$). The chloride in the load solution is replaced by acetate which in turn produces acetic acid. Acetic acid solutions are in the correct pH range for loading the phosphinic acid containing resin.

After loading the yttrium containing solution onto the dialkylphosphinic acid extraction chromatographic column, the column is rinsed with 0.005–0.04 HCL, preferably 0.01M HCL, 19 (FIG. 2) to remove all traces of $^{90}Sr$ to give an overall recovery of $^{90}Sr$>99.9% and reduce $^{90}Sr$ activity by a factor of $10^4$. The acid to remove $^{90}Sr$ does not have to be HCL. The acid may be a strong acid consisting of nitric acid ($HNO_3$), perchloric acid ($HCLO_4$), and sulfuric acid ($H_2SO_4$). Yttrium is then eluted from the column using 0.05–0.3 HCL, preferably 0.1M HCl, 20 (FIG. 2), with an overall recovery of $^{90}Y$>95%. The acid to elute does not have to be HCL. The acid may be a strong acid consisting of nitric acid ($HNO_3$), perchloric acid ($HCLO_4$), and sulfuric acid ($H_2SO_4$). Any traces of extractant or organic degradation products are removed by passing the solution through a bed of polymeric support. Preparation of the final 0.05M HCl solution may be carried out by dilution.

The following tables 1 and 2 describe the behavior of selected metal ions on yttrium selective resins. The following data about $^{90}Y$ were used to calculate some of the information in Tables 1 and 2: Specific activity of $^{90}Sr$ ($t_{1/2}$=28.6 y) ($\lambda$=4.61x$10^{-8}$ $min^{-1}$). 139 Ci/g or 139 milliCi/mg. One Curie of $^{90}Sr$=7.20 mg if pure. Specific activity of $^{90}Y$ ($t_{1/2}$=64.1 hrs.) ($\lambda$=1.80x$10^{-4}$ $min^{-1}$). 0.544 Ci/$\mu$g. One curie of $^{90}Y$=1.84 $\mu$g. Table 1 corresponds to FIG. 1 when the extractant is alkyl alkylphosphonic acid. Table 1 data was collected under the following conditions: Alkyl Alkylphosphonic Acid on Amberchrom CG-71, Particle Size 50–100 $\mu$m, Load 4.0 mL of 0.1 M HCL, Rinse 2.0 mL of 0.1 M HCl/fraction, and Strip 2.0 mL of 1.0 M HCL/fraction. Table 2 corresponds to FIG. 2 when the extractant is dialklyphosphinic acid. Table 2 data was collected under the following conditions: Dialkylphosphinic Acid on Amberchrom CG-71, Particle Size 50–100 $\mu$m, Bed Volume=1.0 mL, 0.7 cm diameter, Flow Rate=1.0 mL/sq. cm/min, Load 9 mL of ~1M Acetic Acid, Rinse 2.0 mL of 0.01M HCl/fraction, and Strip 2.0 mL of 0.1 M HCl/fraction.

TABLE 1

Behavior of Selected Metal Ions on Yttrium Selective Resin
Percent of Total Measured in Each Fraction (for FIG. 1)

| | | RINSE | | | | | STRIP | | | | |
|---|---|---|---|---|---|---|---|---|---|---|---|
| | LOAD | 1 | 2 | 3 | 4 | 5 | 1 | 2 | 3 | 4 | 5 |
| Al | 96 | 3 | 1 | — | — | — | — | — | — | — | — |
| Fe | 0.1 | 0.03 | — | — | — | — | — | — | — | — | — |
| Mn | 97 | 3 | — | — | — | — | — | — | — | — | — |
| Cu | 96 | 3 | 1 | — | — | — | — | — | — | — | — |
| Zn | 95 | 4 | 0.2 | 0.1 | — | — | — | — | — | — | — |
| Sr | 93 | 7 | — | — | — | — | — | — | — | — | — |
| Y | — | — | — | — | — | — | 83 | 17 | 0.1 | — | — |
| Zr | — | — | — | — | — | — | — | — | — | — | — |
| Cd | 97 | 3 | — | — | — | — | — | — | — | — | — |
| Pb | 96 | 3 | 0.3 | 0.3 | 0.2 | — | 0.4 | — | — | — | — |

Alkyl Alkylphosphonic Acid on Amberchrom CG-71, Particle Size 50–100 $\mu$m, Load 4.0 mL of 0.1M HCl, Rinse 2.0 mL of 1.0 M HCL/fraction, and Strip 2.0 ml of 0.1M HCL/fraction.

TABLE 2

Behavior of Selected Metal Ions on Yttrium Selective Resin
Percent of Total Measured in Each Fraction (for FIG. 2)

| | | RINSE | | | | | STRIP | | | | |
|---|---|---|---|---|---|---|---|---|---|---|---|
| | LOAD | 1 | 2 | 3 | 4 | 5 | 1 | 2 | 3 | 4 | 5 |
| Al | 75 | 14 | 8 | 3 | — | — | — | — | — | — | — |
| Fe | 89 | 11 | — | — | — | — | — | — | — | — | — |
| Mn | 89 | 11 | — | — | — | — | — | — | — | — | — |
| Cu | 91 | 9 | — | — | — | — | — | — | — | — | — |
| Zn | 4 | 74 | 10% | 2 | 1 | — | — | — | — | — | — |
| Sr | 94 | 6 | — | — | — | — | — | — | — | — | — |
| Y | — | — | — | — | — | — | 76 | 12 | 4 | 5 | — |
| Zr | 48 | — | — | — | — | — | — | — | — | — | — |
| Cd | 90 | 10 | — | — | — | — | — | — | — | — | — |
| Pb | 88 | 12 | — | — | — | — | — | — | — | — | — |

Dialkylphosphinic Acid on Amberchrom CG-71, Particle Size 50–100 $\mu$m, Bed Volume=1.0 mL, 0.7 cm diameter, Flow Rate=1.0 mL/sq. cm/min, Load 9 mL of ~1M Acetic Acid, Rinse 2.0 mL of 0.01 M HCl/fraction, and Strip 2.0 mL of 0.1 M HCL/fraction.

The foregoing description of preferred embodiments of the invention has been presented for purposes of illustration and description. It is not intended to be exhaustive or to limit the invention to the precise form disclosed. Many modifications and variations are possible in light of the above teaching. For example, $^{91}Y$ may be used for other therapeutic uses not mentioned. Various isotopes of yttrium, such as yttrium-87 and yttrium-91, may be purified using the yttrium selective resin as described herein, although modifications of various acid and extractant concentrations and columnar figure might be necessary. The embodiments were chosen and described to best explain the principles of the invention and its practical application and thereby enable others of ordinary skill in the art to best utilize the invention.

What is claimed is:

1. A process for separating and purifying yttrium isotope consisting of $^{87}Y$, $^{90}Y$, or $^{91}Y$ from strontium-90, comprising:

a. dissolving a nitrate salt of an original $^{90}Sr$ stock solution in $H_2O$ creating a strontium nitrate solution;

b. acidifying said strontium nitrate solution containing $^{90}Y$ with concentrated nitric acid;

c. evaporating said acidified strontium nitrate solution;

d. filtering or centrifuging said evaporated strontium nitrate solution to separate crystalline $^{90}$Sr nitrate salt from said solution to make an yttrium enriched supernate;

e. evaporating said yttrium enriched supernate to dryness;

f. dissolving said dried yttrium enriched supernate which is free of nitric acid in a strong acid;

g. passing said dissolved yttrium enriched supernate through an yttrium selective extraction chromatographic column such that essentially all said yttrium isotope is retained while all other trace metals and impurities pass through and are recycled back to said original $^{90}$Sr stock solution;

h. rinsing said yttrium selective extraction chromatographic column with a strong acid to remove any remaining $^{90}$Sr which is recycled back to said original $^{90}$Sr stock solution; and i. eluting said yttrium isotope from said yttrium selective extraction chromatographic column with a strong acid.

2. A process for separating and purifying said Y isotope as in claim 1 wherein at least 80–90% of the mass of strontium in the original $^{90}$Sr stock solution is stable Sr.

3. A process for separating and purifying said Y isotope as in claim 1 wherein said strong acids are selected from a group consisting of HCL, sulfuric acid, perchloric acid, and nitric acid.

4. A process for separating and purifying said Y isotope as in claim 1 wherein extractant for said yttrium selective extraction chromatographic column is alkyl alkylphosphonic acid.

5. A process for separating and purifying said Y isotope as in claim 4 wherein $^{90}$Y enriched nitric acid residue is dissolved in said strong acid being 0.05–0.4M HCL.

6. A process for separating and purifying said Y isotope as in claim 4 wherein any remaining said $^{90}$Sr is recovered from said yttrium selective extraction chromatographic column with said strong acid being 0.05M–0.4M HCL which is recycled back to said original $^{90}$Sr stock solution.

7. A process for separating and purifying said Y isotope as in claim 4 wherein said yttrium isotape is eluted from said yttrium selective extraction chromatographic column with said strong acid being 0.5–3.0 HCL.

8. A process for separating and purifying said Y isotope as in claim 4 wherein the alkyl in said alkyl alkylphosphonic acid is selected from alkyls consisting of $C_5$, $C_6$, $C_7$, $C_8$, $C_9$, $C_{10}$ and $C_{11}$ straight chained alkanes.

9. A process for separating and purifying said Y isotope as in claim 4 wherein the alkyl in said alkyl alkylphosphonic acid is selected from alkyls consisting of $C_5$, $C_6$, $C_7$, $C_8$, $C_9$, $C_{10}$ and $C_{11}$ branched alkanes.

10. A process for separating and purifying said Y isotope as in claim 4 wherein the alkyl in said alkyl alkylphosphonic acid are alkyls with $C_n$ greater than 11.

11. A process for separating and purifying said Y isotope as in claim 4 wherein the alkyl in said alkyl alkylphosphonic acid are alkyls with $C_n$ less than 5.

12. A process for separating and purifying said Y isotope as in claim 1 wherein extractant for said yttrium selective extraction chromatographic column is dialkylphosphinic acid.

13. A process for separating and purifying said Y isotope as in claim 12 wherein $^{90}$Y enriched nitric acid residue is dissolved in said strong acid being 0.05–0.4M HCL.

14. A process for separating and purifying said Y isotope as in claim 12 wherein any remaining said $^{90}$Sr is recovered from said yttrium selective extraction chromatographic column with said strong acid being 0.005–0.04M HCL which is recycled back to said original $^{90}$Sr stock solution.

15. A process for separating and purifying said Y isotope as in claim 12 wherein said wherein said yttrium isotope is eluted from said yttrium selective extraction chromatographic column with said strong acid being 0.05–0.3 M HCL.

16. A process for separating and purifying said Y isotope as in claim 12 wherein $^{90}$Y enriched nitric acid residue is dissolved in said strong acid being 0.05–0.4M HCL.

17. A process for separating and purifying said Y isotope as in claim 12 wherein the alkyl in said dialkylphosphinic acid is selected from alkyls consisting of $C_5$, $C_6$, $C_7$, $C_8$, $C_9$, $C_{10}$ and $C_{11}$ straight chained alkanes.

18. A process for separating and purifying said Y isotope as in claim 12 wherein the alkyl in said dialkylphosphinic acid is selected from alkyls consisting of $C_5$, $C_6$, $C_7$, $C_8$, $C_9$, $C_{10}$ and $C_{11}$ branched alkanes.

19. A process for separating and purifying said Y isotope as in claim 12 wherein the alkyl in said dialkylphosphinic acid are alkyls with $C_n$ greater than 11.

20. A process for separating and purifying said Y isotope as in claim 12 wherein the alkyl in said dialkylphosphinic acid are alkyls with $C_n$ less than 5.

* * * * *